May 16, 1933.   N. H. RICKER ET AL   1,909,075
COUPLING FOR DOUBLE PIPE SECTIONS
Filed March 12, 1929
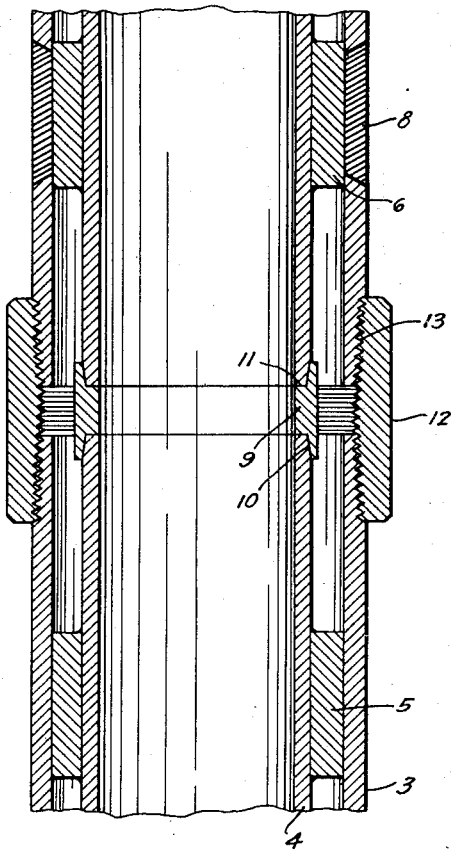
Fig. 2
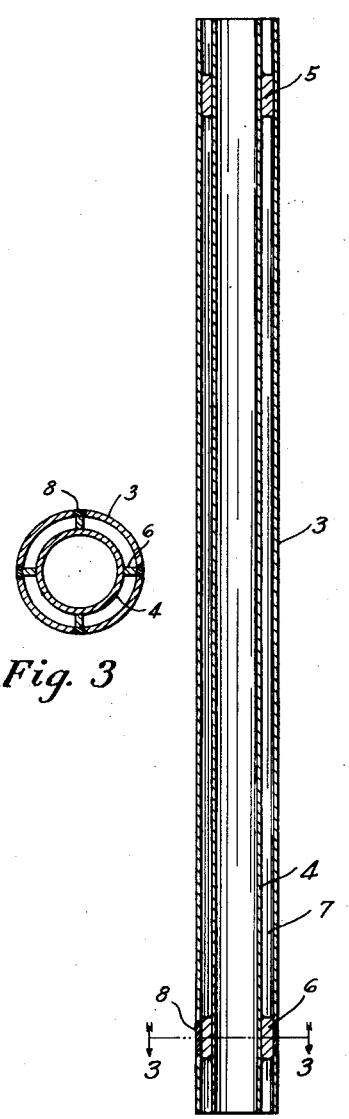
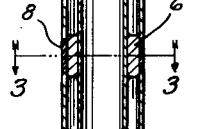
Fig. 3
Fig. 1
Harold W. Fletcher
Norman H. Ricker
INVENTOR
BY Jesse R. Stone
ATTORNEY Patented May 16, 1933

1,909,075

UNITED STATES PATENT OFFICE

NORMAN H. RICKER AND HAROLD W. FLETCHER, OF HOUSTON, TEXAS, ASSIGNORS TO HUGHES TOOL COMPANY, OF HOUSTON, TEXAS, A CORPORATION OF TEXAS

COUPLING FOR DOUBLE PIPE SECTIONS

Application filed March 12, 1929. Serial No. 346,403.

This invention relates to means for forming and coupling together sections of pipe concentrically arranged.

In operations for lifting liquids from deep wells, such as oil, or water wells, it is sometimes desirable to provide two or more concentric pipe sections capable of being assembled for introduction into the well in fixed position relative to each other and spaced uniformly apart. This provides a passage between the pipes for fluid going in one direction and a passage through the inner pipe section, for the fluid passing in the opposite direction.

It is an object of the invention to provide a means of holding the pipe sections in uniformly spaced relation, one within the other.

It is another object to provide means for coupling the ends of both inner and outer sections together in a convenient and expeditious manner, and still prevent leakage of fluid at the joints.

It is desired that the ends of the inner pipe section be forced into sealing relation with the coupling for said inner section by the screwing up of the coupling on the outer sections.

In the drawing herewith, is shown a preferred form of the invention in which

Fig. 1 is a longitudinal section through the two sections of pipe, illustrating the means for spacing the outer and inner sections.

Fig. 2 is an enlarged detail, in section, of the coupling between adjacent pipe ends.

Fig. 3 is a transverse section on the plane 3—3 of Fig. 1.

In constructing our double walled pipe, two or more sections of pipe of the desired internal diameter and of equal length are employed. The two sections are concentrically placed. The outer, or larger section 3, is spaced uniformly from the inner section 4 by spacing blocks 5 adjacent the upper ends and 6 adjacent the lower ends of the pipe sections, but positioned inwardly from the pipe extremities. These blocks are two or more in number and serve to space the pipes apart but do not materially impede the flow of fluid in the space 7 between the pipes.

The said blocks 5 and 6 are welded or otherwise secured firmly to the outer walls of the inner pipe section and the inner pipe section is then inserted in the outer section. The outer section is then welded to the outer faces of the lower blocks 6. This is done by first forming openings in the outer section to register with the said blocks and filling these openings with bonds of welding metal 8 which secures the outer section rigidly to the said blocks 6. The upper blocks 5 are not welded to the outer pipe but serve to fit closely against the inner face of the outer pipe and hold it evenly spaced from the said inner section.

The pipe sections thus welded together form a rigid double walled pipe and when inserted into a well, or when assembled together with other sections for any purpose, must be coupled to other similar sections at the ends thereof. This is done as shown in Fig. 2. A sealing collar 9 is provided to fit between the adjacent ends of the inner pipe sections 4, which are beveled slightly at 10 on their outer walls. The collar 9 overlaps the beveled ends of the pipe and has a beveled inner face to fit against the surface 10 of the pipe. Between the ends of the pipe sections are shoulders 11 formed on the collar to abut against the ends of the pipe.

The outer pipe sections 3 are secured together by an ordinary pipe coupling 12 having a tapered thread connection 13, with the pipe ends.

In assembling the pipe, the ends of adjacent sections are placed together, the seal collar 9 being inserted between the adjacent ends of the inner pipe sections and the collar 12 on the outer sections is screwed in place. This coupling serves to draw the pipe ends together and the beveled ends of the inner pipes are forced into the ends of the collar until said ends abut against the shoulders 11. When this is accomplished, a tight seal is obtained between the ends of both the outer and inner pipes. It has been found that no gaskets nor packing rings are necessary at the joints, the same being fluid tight when the pipe ends are thus brought together.

This pipe is used particularly in wells employing pressure fluid in elevating the well liquid to the surface, but is also adapted for general use where inlet and return passages for fluid are desired or where two types of fluid are to be handled.

What we claim as new is:

1. In combination an outer pipe and an inner pipe, means to hold said pipes in position concentrically with each other, the ends of said inner pipe being beveled slightly, a pipe coupling for said outer pipe, and a sealing collar adapted to fit between the ends of said inner pipe, an inner shoulder on said collar at each end, the ends of said collar being flared outwardly from said shoulders to wedge against the beveled ends of said inner pipe when said coupling is tightened.

2. A device of the character described including inner and outer concentric pipe sections, means to space said pipes in concentric relation, the ends of said outer pipe sections being tapered and threaded externally, a pipe coupling engaging said threaded ends, a seal collar between the ends of said inner pipe sections, said collar having an inner radial shoulder adjacent the inner periphery, and a flaring wall at the outer ends of said coupling to receive and abut the ends of said inner pipe sections and form a fluid tight connection therewith.

3. A device of the character described including inner and outer concentric pipe sections, means to space said pipes in concentric relation, the ends of said outer pipe sections being tapered and threaded externally, a pipe coupling engaging said threaded ends, a seal collar between the ends of said inner pipe sections, a flaring recess at each end of said collar, and a stop shoulder at the inner ends of said recess, the ends of said inner pipe sections being adapted to abut said shoulders when said coupling is tightened.

In testimony whereof, we hereunto affix our signatures, this 8 day of March, A. D. 1929.

HAROLD W. FLETCHER.
NORMAN H. RICKER.